April 5, 1938.  L. G. COPEMAN  2,113,014
APPARATUS FOR HANDLING ICE CUBES
Filed March 20, 1936  2 Sheets-Sheet 1

INVENTOR.
Lloyd G. Copeman
BY
ATTORNEYS

April 5, 1938.　　　L. G. COPEMAN　　　2,113,014
APPARATUS FOR HANDLING ICE CUBES
Filed March 20, 1936　　　2 Sheets-Sheet 2

INVENTOR.
Lloyd G. Copeman
BY Barnes, Kisselle, Laughlin & Raisch
ATTORNEYS.

Patented Apr. 5, 1938

2,113,014

UNITED STATES PATENT OFFICE 2,113,014

APPARATUS FOR HANDLING ICE CUBES

Lloyd G. Copeman, Flint, Mich., assignor to Copeman Laboratories Company, Flint, Mich., a corporation of Michigan Application March 20, 1936, Serial No. 69,830

16 Claims. (Cl. 62—89)

This invention has to do with the art of refrigeration and it relates particularly to that phase of refrigeration of making ice cubes and handling of the same after they are made, until use, with particular reference to the removing of the cubes from the receptacle in which they were frozen.

From the domestic standpoint, ice cubes are usually used for refreshing drinks or the like, and it is a somewhat difficult and/or unhandy procedure to extract and handle the frozen cubes from the container in which they were frozen, even though a rubber freezing tray is used. It is, of course, more difficult where a metal freezing tray is used. Also, even though the cubes may be readily extracted from a rubber tray, or any other tray with surfacing to which the ice does not tightly adhere, or trays especially constructed to be flexed to release the cubes, the obtaining of and the handling of the cubes consumes some time and is an inconvenience.

This invention is directed particularly to structural arrangements in a refrigerator, and a method, whereby the cubes become automatically released from the freezing container, preferably at a time somewhat in advance of when they are to be used, and to an arrangement for storing the cubes in frozen form. This is accomplished by providing compartments where different temperatures may be maintained and especially a compartment for receiving an ice tray, with frozen cubes therein, in an inverted position, the temperature of which is above freezing, and another compartment for receiving the cubes of ice and storing them, at a temperature somewhere near the freezing point after they have become automatically released from the inverted tray. Briefly, a tray with frozen cubes therein is placed in an inverted position in such an environment that the cubes become loose and fall out of the tray and are directed into a storage compartment.

Figure 1:
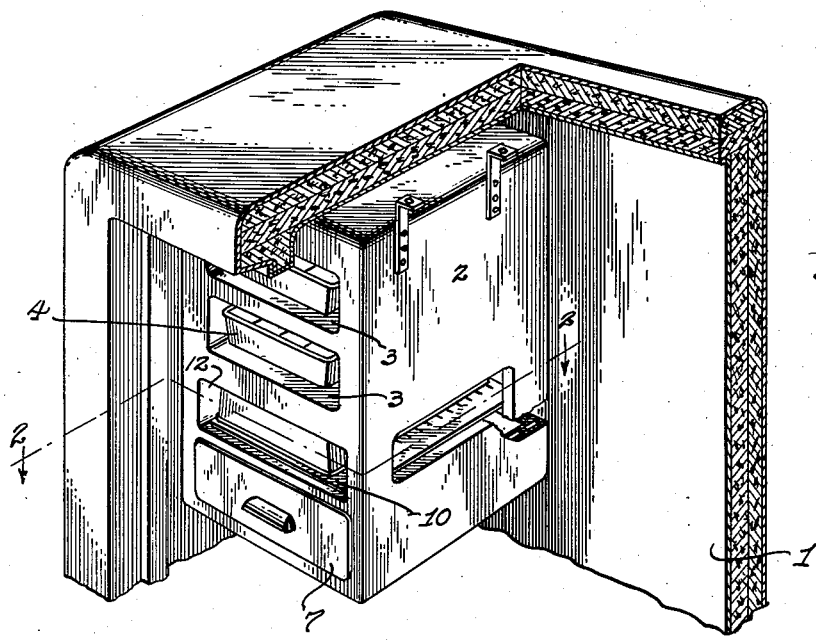
Fig. 1 is a view partly in section, illustrating the interior of a refrigerating cabinet and showing a cooling unit such as may be employed in carrying out the invention.

The walls of the refrigerator cabinet are shown at 1 in Fig. 1, and a cooling unit, generally indicated at 2, is mounted within the cabinet. Except for the particular structure utilized for carrying out the invention, this cooling unit may be of any suitable type. The cooling unit is provided with a suitable number of compartments 3 for receiving trays 4 suitably partitioned to in turn receive water to be frozen. The compartments 3 are usually closed at the front by suitable means (not shown). As is customary, the temperatures of the sharp freezing chambers 3 are considerably below freezing so that the water in the trays is frozen and ice cubes formed.

Figure 2:
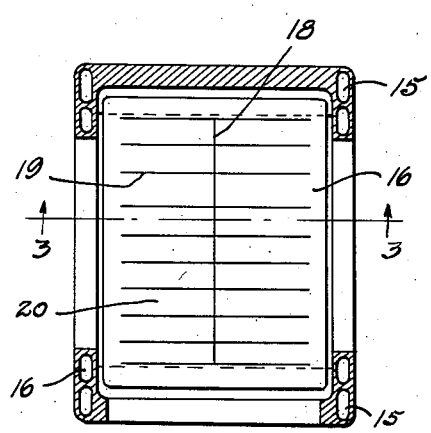
Fig. 2 is a cross sectional view taken substantially on line 2—2 of Fig. 1.
Figure 3:
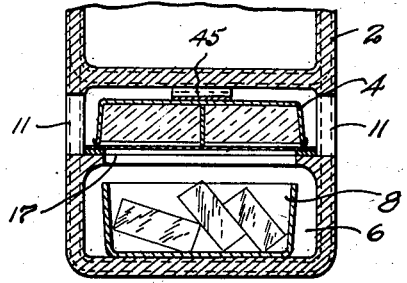
Fig. 3 is a vertical cross sectional view taken through a part of the cooling unit.

The cooling unit, as shown in Figs. 1, 2 and 3, has a lower compartment 6 which may be closed by a suitable closure member 7 and this compartment 6 may receive a storage vessel 8. This cooling unit has an intermediate compartment 10 which is preferably open to the circulation of convection currents within the refrigerator. To this end it may be open on opposite sides as shown at 11, and the front may be open as illustrated at 12.

As illustrated herein, three or more ice cube trays may be used. Two trays may be in the sharp freezing chambers, as shown, and one with ice cubes therein may be placed in the compartment 10. This tray, however, is disposed in the compartment 10 in an inverted position as shown in Fig. 3.

Now preferably, the temperatures in the sharp freezing chambers 3, in the storage compartment 6, and in the intermediate compartment 10 are different. By way of example, the following temperatures may be mentioned, although the invention of course is not limited to these temperatures by any means: the sharp freezing chambers 3 may be at about 0° F.; the storage compartment 6 may be somewhere near freezing temperature, say 30° F. The intermediate compartment, being open to the convection currents, may be at a temperature similar to the general temperature within the refrigerator, say 40 to 45° F.

The storage compartment 6 may be subjected to some refrigeration action to which end the unit may have refrigerant passageways 15 for containing refrigerant, and which extend around the storage compartment.

When one anticipates that some ice cubes will be needed, one of the trays is removed from the sharp freezing chamber and placed in an inverted position in the compartment 10. Due to the relatively high temperature, the ice will begin to melt and the cubes will become free from the tray and will fall by gravity into the compartment 6, and more specifically into the receptacle 8. Here the cubes are stored and prevented from further melting and are easily accessible for use.

Inasmuch as the storage compartment is to be maintained at a lower temperature than an intermediate compartment, it is preferred that some means be provided to aid in insulating the two compartments and to aid in preventing air currents from passing into the storage compartment. To this end a partition 16 is provided to close off the opening 17 between these two compartments. This partition preferably is of rubber or some other readily flexible material cut through to provide individually flexible parts. For example, as shown in Fig. 2, the partition may have a longitudinally extending cut line 18 and cross cut lines 19, thus forming individually flexible parts or wings 20. Normally these parts lie substantially in a common plane as shown in Fig. 3. However, when an ice cube falls thereon the wings will not support the weight and allow the cube to drop therethrough, and then by reason of being flexed shift back to their original closed position. The cut lines 18 and 19 preferably do not extend through the edges of the partition.

Figure 4:
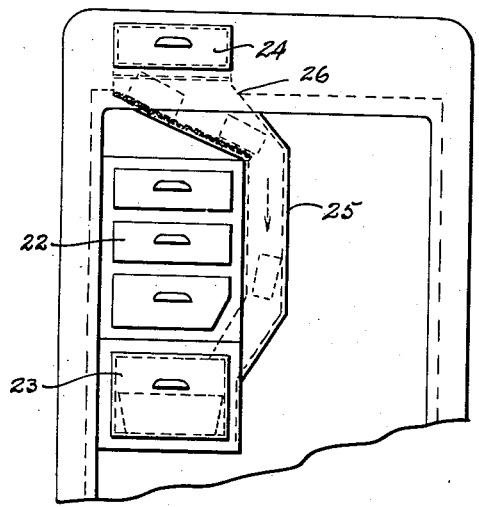
Fig. 4 is a view illustrating a modified form of the invention.

In Fig. 4 there is shown a modified form. Here the sharp freezing chambers are shown at 22 and storage compartment as at 23. A tray from a sharp freezing chamber is placed in an inverted position in a compartment mounted near the top of the cabinet and within the insulation thereof, the compartment being illustrated at 24. A suitable chute 25 leads from the compartment 24 to the storage receptacle 23. The inside of the chute may be lined with a metal mesh cloth or screen 26 to minimize the tendency of the ice cubes to stick thereto. In this form, the transfer compartment 24 is located outside of the refrigerating compartment and is so positioned relative to the outer wall of the cabinet that its temperature will be such as to cause melting and releasing of the ice cubes.

Figure 5:
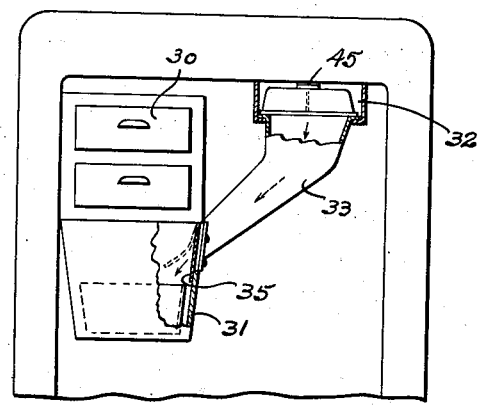
Fig. 5 is a view illustrating a further modified form.

In Fig. 5 the sharp freezing chambers are illustrated at 30, the storage compartment at 31, and the releasing or transferring compartment at 32 located inside the refrigerator and exposed to the temperature therein. A tray is placed in the compartment 32 and as the cubes are released they pass through a chute 33 into the storage compartment. The end of the chute entering the storage compartment may be normally closed by a flexible partition 35, such as rubber, which is flexed, as illustrated by the dotted lines, when an ice cube slides down the chute and falls into the storage compartment.

Figure 6:
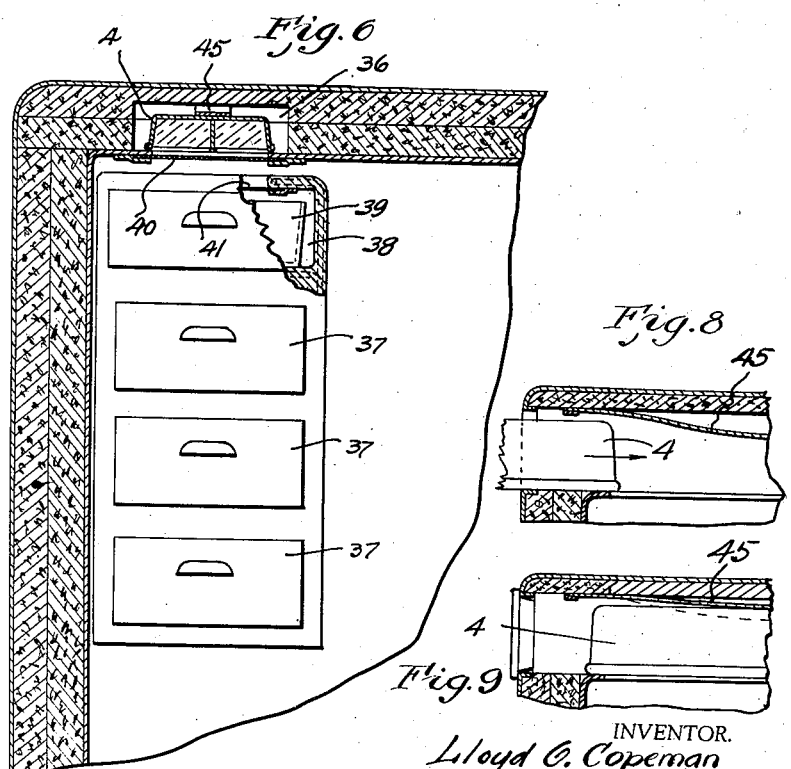
Fig. 6 is a view partly in section and with parts cut away illustrating a still further modified form.

In Fig. 6 there is a storage compartment 36 located out of the refrigerated zone and for receiving a tray of ice cubes with the tray in inverted position, as shown. The sharp freezing chambers are illustrated at 37 and the storage compartment as at 38 which may be provided with a receptacle 39. The slotted rubber partitions may be used in this form, and in fact two may be used, one being illustrated at 40 for closing the compartment 36 and one at 41 for closing the storage compartment. In this form, as well as in the form shown in Figs. 4 and 5, the storage compartment may be refrigerated to an extent to provide the desired temperature at or about freezing.

Figure 8:
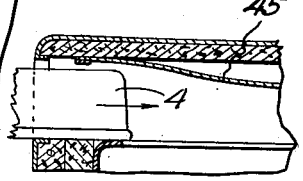
Fig. 8 is a partial cross sectional view illustrating a structure which may be used in aiding the discharge of the cubes for an inverted tray.
Figure 9:
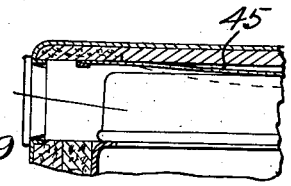
Fig. 9 is a cross sectional view similar to Fig. 8 showing the tray in position.

It has been found that a slight agitation or movement or flexing of the ice cube tray, or portions thereof, aid materially in the discharge of the cubes therefrom. Therefore, means may be used to accomplish this action. One way of doing it is that of using a spring 45, as shown in detail in Figs. 8 and 9. This is especially useful with a rubber tray. As an inverted tray is placed into the releasing compartment, as illustrated in Fig. 8, the spring is flexed and it presses downwardly upon the bottom of the tray which is uppermost, as illustrated in Fig. 9. When the cubes become somewhat melted and begin to become loose from the walls, the pressure of the spring causes the tray to be flexed as the spring presses down upon the tray. This aids in causing release of the cubes and may shorten the time required to effect release of the ice cubes from the tray.

Figure 7:
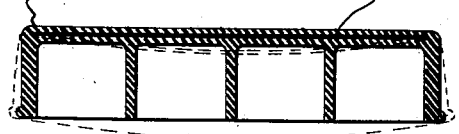
Fig. 7 is a cross sectional view of a tray structure which may be used in carrying out the invention.

A further manner of accomplishing this action is that of embodying a thermo-responsive element in the tray structure, and in this case the tray may be either of rubber or metal. This is shown in Fig. 7. The tray here shown may be of rubber and is indicated at 50. In the bottom of the tray is located a bimetallic element 51. At the temperature at which the ice cubes are frozen this bimetallic element may take one formation. As for example, it may be substantially straight as illustrated. However, when the temperature is increased in the transfer compartment, the bimetallic element may flex to in turn flex the tray somewhat as illustrated by the dotted lines in Fig. 7. This slight agitation or shifting of the walls of the tray or parts thereof aids in the discharge of the ice cubes.

While the invention has been described in connection with a domestic refrigerating cabinet it is, of course, not to be limited thereto. When it is anticipated that ice cubes will be needed, or if it be the desire of the person in charge to have ice cubes readily available, one of the trays with frozen cubes therein is removed from a sharp freezing chamber and disposed in inverted position in the transfer compartment. In due course the cubes are discharged from the inverted tray and deposited in the storage compartment. Only a relatively short time may be needed, which time may depend somewhat upon the temperature attained in the transfer chamber upon the presence or non-presence of a device such as the spring or thermo-responsive element, and the effectiveness or amount of movement or agitation these elements give to the inverted tray. In this manner a supply of free ice cubes are stored and are immediately available for use.

While the invention may be particularly advantageous from the standpoint of making ice cubes, and has been so described, it is to be appreciated that the invention may be used with frozen food stuffs, such as ice cream or frozen ice delicacies and the like. These substances have a water content and in the claims appended hereto, where it is said that water is frozen, this language is to cover such food stuffs.

I claim:

1. In a refrigerating mechanism, the combination of a sharp freezing chamber for freezing water retained in a tray, an auxiliary compartment adapted to receive a tray with ice therein with the tray in inverted position, means for mechanically loosening said ice from said inverted tray, a storage compartment into which the ice is directed when the same has become loose from the walls of the inverted tray, and means for maintaining the storage compartment at about the freezing temperature of water.

2. In a refrigerating mechanism, the combination of a sharp freezing chamber for freezing water retained in a tray, an auxiliary compartment adapted to receive an ice filled tray in inverted position, mechanical means for ejecting said ice from said inverted tray, and a storage compartment in communication with the first mentioned compartment maintained at a temperature of about freezing for receiving the ice from the inverted tray by gravity.

3. In a refrigerating mechanism, the combination of a compartment arranged to be maintained at a temperature above freezing and adapted to receive a tray with ice therein and in an inverted position, a storage compartment below the first mentioned compartment and in communication with said first mentioned compartment for receiving ice as the same is released from the inverted tray by partially melting and falls into the storage compartment by gravity, and a flexible partition normally closing the compartments from each other and flexing under weight of the ice to permit the passage of the same therethrough.

4. In a refrigerating mechanism, the combination of a compartment arranged to be maintained at a temperature above freezing and adapted to receive a tray with ice therein and in an inverted position, a storage compartment below the first mentioned compartment and in communication with said first mentioned compartment for receiving ice as the same is released from the inverted tray by partially melting and falls into the storage compartment by gravity, and a partition of rubber between the two compartments, said partition having cut lines therein to provide individually flexible parts which flex to permit bodies of ice to pass therethrough.

5. In a refrigerating mechanism, a cooling unit having a sharp freezing chamber in its upper portion for freezing water retained in a tray, a compartment in its intermediate portion adapted to receive a tray with ice in an inverted position, means for mechanically ejecting ice from said inverted tray, and another compartment in the lower portion of the cooling unit for receiving ice as the same falls by gravity from the inverted tray in the intermediate compartment.

6. In a refrigerator, a cooling unit having sharp freezing chambers to be maintained below freezing temperature, a storage compartment adapted to be maintained at about freezing temperature, another compartment located relatively remote from the storage compartment and in a position so that its temperature is above freezing, said other compartment adapted to receive a tray with ice therein in an inverted position, and conveying means for conveying the ice from said other compartment to the storage compartment.

7. In a refrigerator, a cooling unit having sharp freezing chambers for freezing water, a storage compartment, another compartment located above the refrigerated area of the refrigerator and adapted to receive a tray with ice therein with the tray in inverted position, said other compartment being positioned so that its temperature is maintained above freezing whereby the ice partially melts in the inverted tray and becomes released therefrom, and a chute connecting said other compartment with the storage compartment for conveying released ice to the storage compartment.

8. In a refrigerator, a cabinet having a refrigerated space, a cooling unit provided with sharp freezing chambers for freezing water, a storage compartment, another compartment located in the upper portion of the said space and adapted to receive a tray with ice therein in inverted position, said other compartment arranged so that the maintained temperature is above freezing whereby the ice may partially melt and become released from the inverted tray, and a chute for directing the released ice from the inverted tray to the storage compartment.

9. In a refrigerator, insulated walls defining a refrigerated space, a cooling unit having sharp freezing chambers, a compartment outside of the refrigerated space and located within the insulation of the walls and adapted to receive a tray containing ice and in inverted position, and a storage compartment below the first mentioned compartment for receiving and storing ice as the same falls from the inverted tray by gravity.

10. In a refrigerator, insulated walls defining a refrigerated space, a cooling unit having sharp freezing chambers, a compartment outside of the refrigerated space and located within the insulation of the walls and adapted to receive a tray containing ice and in inverted position, a storage compartment below the first mentioned compartment for receiving and storing ice as the same falls from the inverted tray by gravity, and means for refrigerating the storage compartment and maintaining its temperature at above freezing.

11. In a refrigerator, the combination of a compartment maintained above freezing temperature adapted to receive a tray with ice therein in inverted position whereby the ice may partially melt and become released from the inverted tray, a storage compartment positioned to receive the ice and store the same when the same falls by gravity thereinto from the inverted tray, and means for causing movement of the walls of the inverted tray while in the first compartment.

12. In a refrigerator, the combination of a compartment maintained above freezing temperature adapted to receive a tray with ice therein in inverted position whereby the ice may partially melt and become released from the inverted tray, a storage compartment positioned to receive the ice and store the same when the same falls by gravity thereinto from the inverted tray, and a spring acting upon the inverted tray for flexing the walls thereof to aid in causing release of the ice therein.

13. In a refrigerator, the combination of a compartment maintained above freezing temperature adapted to receive a tray with ice therein in inverted position whereby the ice may partially melt and become released from the inverted tray, a storage compartment positioned to receive the ice and store the same when the same falls by gravity thereinto from the inverted tray, and a thermo-responsive element for flexing some of the walls of the inverted tray to aid in the discharge of the ice therefrom.

14. In a refrigerator, the combination of a compartment maintained above freezing temperature adapted to receive a tray with ice therein in inverted position whereby the ice may partially melt and become released from the inverted tray, a storage compartment positioned to receive the ice and store the same when the same falls by gravity thereinto from the inverted tray, and a thermo-responsive element associated with the tray as a part thereof for flexing the walls thereof as the temperature increases above freezing in the first compartment to aid in the discharge of the ice from the inverted tray.

15. An ice tray for a refrigerator or the like for receiving water and in which the same is frozen, and a thermo-responsive element embedded in a wall of said tray, said thermo-responsive element being adapted to be distorted by a rise of temperature, said distortion serving to flex the tray to aid in the discharge of ice from the tray.

16. In a refrigerator, a cooling unit having a sharp freezing chamber for receiving a portable unitary container in which ice cubes are adapted to be frozen, a storage compartment in thermal conducting relation with the cooling unit and maintained at or below the freezing temperature of water, means positioned in dispensing relation to said storage compartment for receiving said container filled with ice cubes in inverted position, and means for causing positive ejection of the cubes from said inverted container into the storage compartment.

LLOYD G. COPEMAN.